(12) United States Patent
Korner et al.

(10) Patent No.: US 7,144,348 B2
(45) Date of Patent: Dec. 5, 2006

(54) WEB UNIT

(75) Inventors: Tillmann Korner, Zang (DE); Gerhard Meier-Burkamp, Heidenheim (DE); Konrad Langenbeck, Gerlingen (DE); Timm Schwammle, Benningen (DE); Christian Gloggler, Blaustein (DE)

(73) Assignee: Voith Paper Patent GmbH, Heidenheim (DE)

( * ) Notice: Subject to any disclaimer, the term of this patent is extended or adjusted under 35 U.S.C. 154(b) by 119 days.

(21) Appl. No.: 10/483,434

(22) PCT Filed: Jul. 8, 2002

(86) PCT No.: PCT/EP02/07579

§ 371 (c)(1),
(2), (4) Date: Apr. 5, 2004

(87) PCT Pub. No.: WO03/008843

PCT Pub. Date: Jan. 30, 2003

(65) Prior Publication Data

US 2004/0171455 A1    Sep. 2, 2004

(30) Foreign Application Priority Data

Jul. 11, 2001  (DE) .............................. 101 33 703

(51) Int. Cl.
*F16H 57/08* (2006.01)

(52) U.S. Cl. ........................................ 475/331

(58) Field of Classification Search ............ 475/331, 475/348; 403/1; 384/276–300; 411/395, 411/546

See application file for complete search history.

(56) References Cited

U.S. PATENT DOCUMENTS 5,692,989 A * 12/1997 Kamlukin .................. 475/346
6,106,429 A * 8/2000 Mortensen .................. 475/331
6,651,336 B1 * 11/2003 Bauknecht et al. ........... 29/893
6,692,401 B1 * 2/2004 Hofschulte et al. ......... 475/331
2003/0008748 A1 * 1/2003 FOX .......................... 475/346
2003/0181284 A1 * 9/2003 Chen ......................... 475/331
2005/0207862 A1 * 9/2005 Aasgaard .................... 411/29

FOREIGN PATENT DOCUMENTS

| DE | 36 38 422 | 5/1987 | |
| DE | 199 45 242 | 3/2001 | |
| DE | 19945242 A1 * | 3/2001 | |
| EP | 0 238 921 | 10/1989 | |
| FR | 1 005 218 | 4/1952 | ............... 3/5 |
| FR | 1 089 588 | 3/1955 | ............... 3/5 |

(Continued)

*Primary Examiner*—Sherry Estremsky
(74) *Attorney, Agent, or Firm*—Taylor & Aust, P.C.

(57) ABSTRACT

A web unit for planet gear sets for the mounting of planet gears including a first web element and a second web element, which are tightly connected and can be tensioned in axial direction by transmission or connecting elements progressing in axial direction and describing a theoretical connecting axis. Each transmission or connecting element has regions of differing radial dimensions, the front faces of the regions, thus formed and facing the individual web elements, form a first and a second contact surface, resting either directly or through an intermediate element against the contact surfaces in contact regions, formed by the front faces of the web elements facing each other. At least one element forming a contact surface of a contact region includes a profile. The profile is characterized in the radially external region by at least one region of greater axial extension in the direction of the theoretical connecting axis.

15 Claims, 8 Drawing Sheets

FOREIGN PATENT DOCUMENTS

| | | | | | |
|---|---|---|---|---|---|
| FR | 2 639 701 | 6/1990 | WO | WO 01/21984 | 3/2001 |

* cited by examiner

CONTOURED CONTACT SURFACES

TRANSFER ELEMENTS

WEB UNIT

BACKGROUND OF THE INVENTION

1. Field of the Invention

The present invention relates to a web unit on a planet gear set, and, additionally, a planet gear set including a web unit.

2. Description of the Related Art

Planet gear sets are used primarily in applications when high speeds and power are to be transmitted coaxially at high power density. Due to ever increasing demands upon the transmission capability, the rigidity of a planet gear set with a view to tooth modification is constantly gaining in importance. A decisive influence upon the overall rigidity of the planet gear set is the configuration of the web. Especially in configurations featuring a split web, including a first web element that is tightly connected with the drive side and a second web element that is tightly connected to the output side and which are tightly connected with each other and are tensioned in axial direction by way of transmission elements in the form of graduated bolts, deformations of these individual connected elements occurring under stress result in very unsatisfactory width load capacity of the planet gears that are mounted on the web, considering the type of teeth provided on the sun wheels and/or ring gears. The result can be damage to the teeth. Even increasing the axial pressure does not solve this problem.

What is needed in the art is a web unit that has a rigid planet gear construction and optimum load characteristics of the individual gearing elements are ensured.

SUMMARY OF THE INVENTION

The present invention provides a web unit that has a rigid planet gear construction with optimum load characteristics of the individual gearing elements ensured.

The present invention relates to a web unit for planet gear sets for the mounting of planet gears including a first web element and a second web element, which are tightly connected to each other and can be tensioned in axial direction by way of transmission or connecting elements progressing in axial direction and describing a theoretical connecting axis. Each transmission or connecting element has regions of differing radial dimensions, whereby the front faces of the regions, thus formed and facing the individual web elements, each form contact surfaces, a first and a second contact surface, resting either directly or through an intermediate element against the contact surfaces in so-called contact regions, formed by the front faces of the web elements facing each other. According to the present invention at least one element forming a contact surface of a contact region includes a profile. The profile is characterized in the radially external region by at least one region of greater axial extension than in the direction of the theoretical connecting axis described by the transmission or connecting element between the two web elements. The transmission or connecting element or merely part of the transmission or connecting elements facilitates mounting of the planet gears, as well as the tight connection of the two web elements.

In unstressed condition, that is, without torque transmission, the partial surfaces of the contact surfaces that form the contact regions extend over a section of the front faces of the web element and transmission element facing each other. The adjacent surface of the front faces of the web element and transmission element facing each other is not in contact with each other in this operational state. Under tension, the contact regions are formed between web and transmission element. In non-loaded condition of the web unit, that is in its installed state and free from torque transfer by way of interaction that are formed between the profile and the section of the contact surface facing the profile on the other element, such as the web element or transmission element. Under tension, a contact between the surfaces between the transmission element and the web unit occurs only in the area of the profile. There is no contact in this operational condition in the adjacent area, only when there is a load on the web unit.

The presently inventive solution therefore, prevents with simple elements a gaping of the individual components in the contact region due to deformation of the web elements and ensures a rigid web construction. This provides optimum conditions for mounting of the planet gears in order to ensure the width load capacity of the gearing under all operational conditions. In addition to an external positioning of the contact surfaces, the profile also provides for uniform positioning and thereby a distribution of the necessary force for pressing upon a larger surface. On the one hand this permits realization of larger pressing forces without having to submit to the risk of seating under a load and thereby loosening of the connection, due to partially achieving, or exceeding the yielding points. This solution also permits utilization of low-strength materials, for example aluminum. Even if the bolt is engaged on the outside for process reliability, the pressing forces following installation, and primarily during operation are lower due to the larger surface and due to better support. Lower stress upon the materials can be expected.

The profile may be provided on the web element and/or the transmission element. According to a further development it can also be provided by an intermediate element that is located between the transmission element or the contact surfaces that are created by the cross sectional changes and are facing the web elements, and between the web elements, whereby the intermediate element surrounds the transmission or connecting element at least partially in circumferential direction, and whereby the intermediate element forms a contact surface always on its side facing directly toward a web element. Here, the contact areas always exist between web element and intermediate element, and intermediate element and transmission element. In this instance too, at least one of the surfaces of a contact region that is formed by an intermediate element, is equipped with a profile. The profile is also characterized in the radially external region by way of at least one region of greater axial extension than in the direction of the theoretical connecting axis through the transmission element between the two web elements. Preferably each intermediate element is always in full contact with the neighboring element in the respective other contact region. The intermediate element is preferably clamped between transmission element and web element, or is connected by way of a compression joint with the transmission element.

The solution of the intermediate element provides the advantage that standardized transmission elements and web elements can be utilized and that no additional treatment of said elements is necessary. Deformation of varying magnitudes can be compensated merely by the choice of the intermediate element.

Profiling can occur by continuous cross section change in the area of a contact surface, in the direction of the theoretical connecting axis, or also by non-sequential change. The profile is, for example, in the form of a protrusion in the axial direction, or in the cross section of the web element, transmission element or intermediate element, viewed in direction of the tapering of the cross section of the theoretical connecting axis characterized by the transmission element.

The transmission or connecting element can be of varying design. The different radial dimensions on the outside circumference are realized by the embodiment of a step bolt. This can be in the form of an integral component, or can include several individual components. In the first scenario, the construction of the step bolt depends on the type of fastening. This can occur by equipping at least one end region of the step bolt with a thread and by fastening, for example through a ring nut. Another design provides that at least one section in the end region is equipped with an internal thread that, in the installation position, extends into the web elements. Fastening can then be accomplished by a cover plate allocated to the web element, whereby the cover plate has a clearance opening for a fastening element, for example a screw. In the instance of two-sided configuration of the end region of the step bolt, tensioning can be created in this manner. Preferably, however, tensioning is realized by the tensioning devices that run through the step bolt. In this instance the step bolt is a single part component. It is however configured as a step bolt bushing element through which a tightening bolt can be positioned. The tightening bolt can be supported either directly in a web element or in an intermediate element, and can be secured on the other web element by way of a ring nut. Another variation can be to run a tightening bolt through the sleeve and to secure it on both sides with appropriate ring nuts.

In a multi-component configuration of the step bolt the bolt can include, for example, a first support sleeve that is preferably characterized by a constant diameter along its axial extension; and an additional second sleeve that serves to mount the planet gear and that describes the area of a larger radial dimension. The second support sleeve is drawn over the first support sleeve. It is preferable to select a press fit between the two components. Here too, axial tensioning between the two web elements can be accomplished by providing a tightening screw or tightening bolt or appropriate fastening device on both sides of the web elements. The actual configuration in each individual application is at the discretion of the responsible resident expert.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 2A:
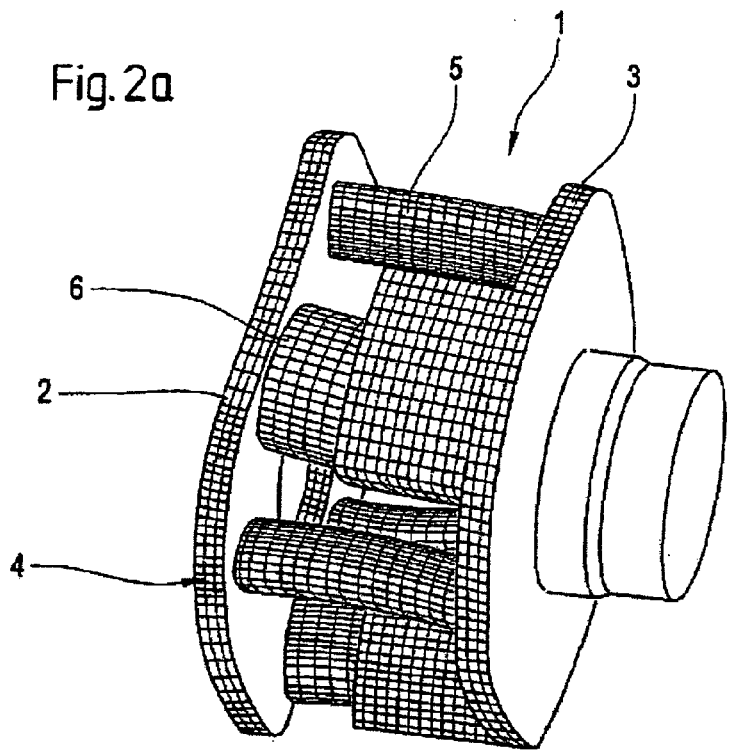
FIGS. 2a and 2b illustrate the basic problem of deformations of the individual web components, during power transfer.
Figure 2B:
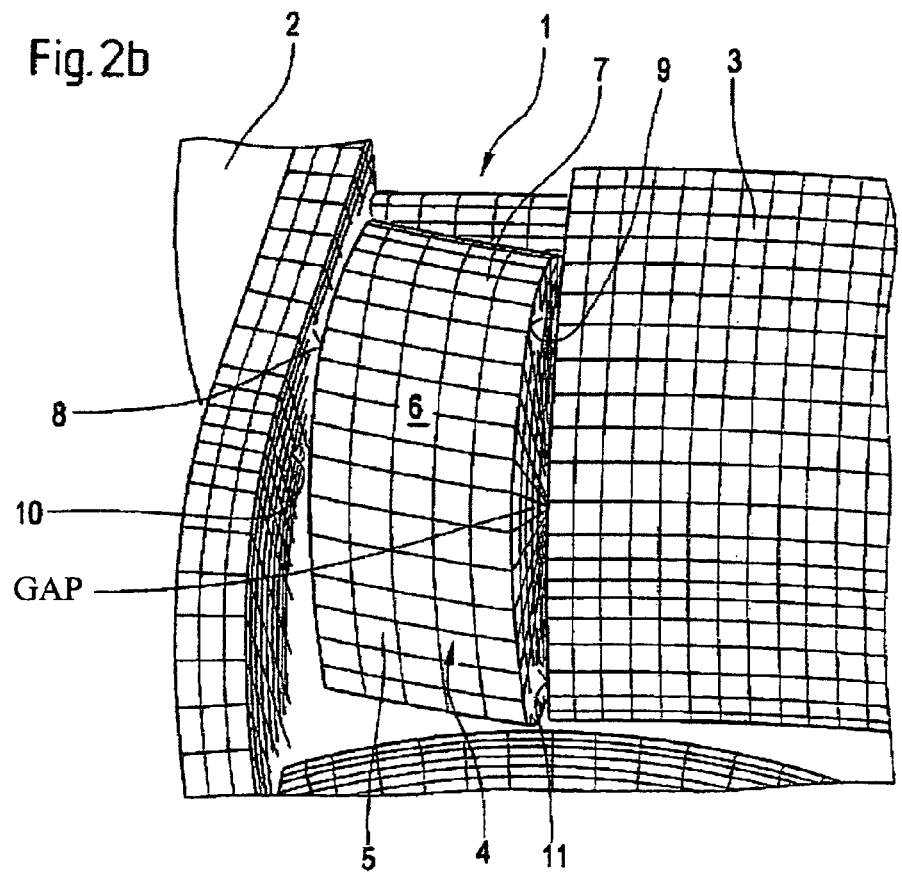

Referring now to the drawings, and more particularly to FIGS. 2a and 2b, there is illustrated with an example of an embodiment of a web 1 according to the state of the art the problematic deformation occurring on the individual elements of the web in a split web construction, during power transfer. Web 1 includes a first web element that is described as first cheek plate 2 that can be coupled with the drive or output side when utilized in a planetary gear set in a drive train, and also includes a second web element that is indicated as second cheek plate 3. According to the tying of the first cheek plate to the drive or output side, second cheek plate 3 can be connected with the drive or output side. The two cheek plates, first cheek plate 2 and second cheek plate 3, are connected with each other in axial direction through element 4 for axial connection. Element 4 can be configured in various ways. In the illustrated example they include transmission or connecting elements 5 that are located preferably at equal distances, viewed in circumferential direction of cheek plates 2 and 3. These transfer load from the drive-side cheek plate to the output-side cheek plate. In the illustrated example, first cheek plate 2 functions as the drive-side cheek plate and second cheek plate 3 as the output-side cheek plate. A large amount of the load is transferred through the transmission or connecting elements 5 to the output-side cheek plate, thereby causing a deformation of drive-side cheek plate 2. At an increased power transfer this can additionally lead to gaping between the transmission or connecting elements 5 and the cheek plates, especially first cheek plate 2. This gaping is illustrated in an enlarged detail depiction from the example of a split web 1, according to FIG. 2a. Since the transmission elements 5 which are generally pressed together with the two cheek plates, first cheek plate 2 and second cheek plate 3, or which are tensioned through other ways in axial direction with the two cheek plates, first cheek plate 2 and second cheek plate 3, also support the planetary gears when utilized in planetary gear sets, the gaping results in a reduction of the overall rigidity and in a deterioration of the width load capacity of the teeth of the planetary gears. Even a definite increase in the axial pressing leads to only a negligible improvement of the load situation.

The transmission elements 5 generally take the embodiment of step bolts 6. The region of the larger diameter 7 of the step bolt 6 is provided between the two cheek plates, first cheek plate 2 and second cheek plate 3. The smaller diameter region extends through the cheek plate. The front faces 8 and 9 of step bolt 6 in the region of the larger diameter 7 always face toward first cheek plate 2 or second cheek plate 3. When the two cheek plates, first cheek plate 2 and second cheek plate 3, are under tension the front faces represent the contact surfaces for front faces 10 and 11 on first cheek plate 2 and second cheek plate 3.

FIG. 2b clearly indicates that gaping occurs especially between front faces 9 and 11 on transfer element 5 that interact with each other under axial tension, or second output-side cheek plate 3. In addition to the thereby determined deformations on the connecting elements, that is, first cheek plate 2 and second cheek plate 3, problems also occur regarding the width load capacity in the teeth.

Figure 1A:
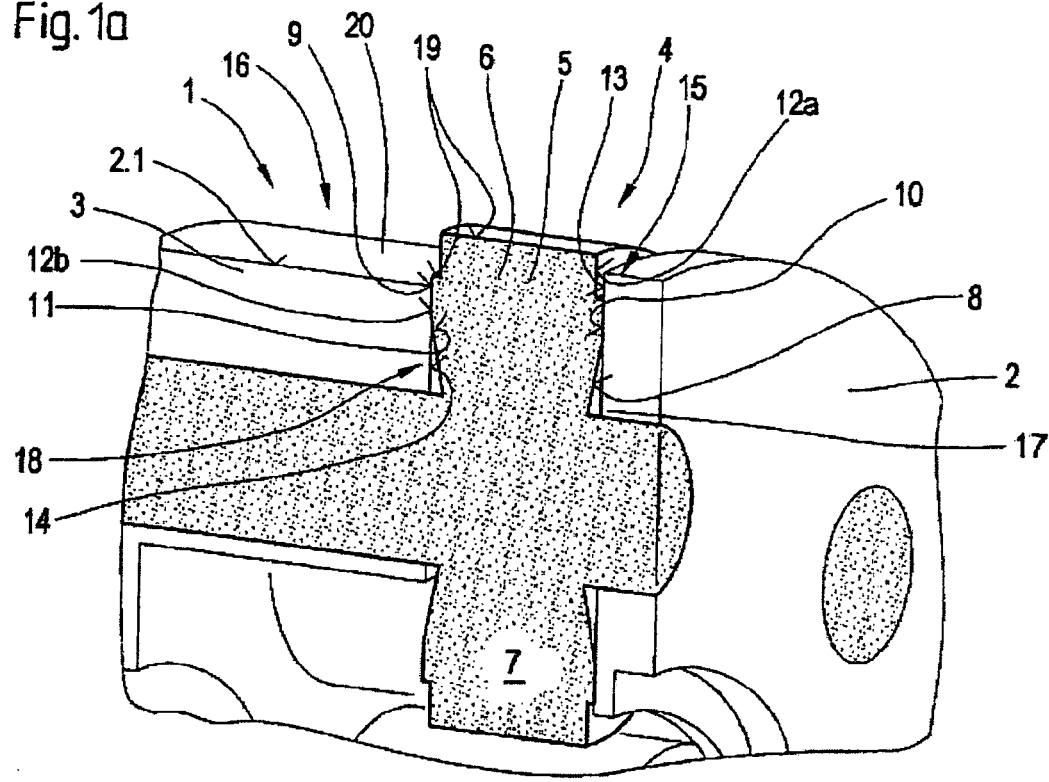
FIGS. 1a–1c is a web section of a planetary gear set illustrating a first inventive embodiment of the profile on the contact surfaces of the power transferring elements according to the present invention.

With the depiction of transmission element 5, FIG. 1a illustrates a sectional view of a split web 1 in a first embodiment of the presently inventive design of the profile of the contact surfaces of the individual elements of web 1 that interact with each other under load conditions. The basic construction is consistent with that already described in FIG. 2. Web 1 includes first cheek plate 2 and second cheek plate 3. When utilized in a planetary gear set these are coupled with the drive-side or output-side respectively. The two cheek plates, first cheek plate 2 and second cheek plate 3, are coupled with each other in axial direction by element 4. The element 4 includes a transmission or connecting element 5 in the embodiment of step bolts 6. Step bolt 6 includes a region of a larger diameter 7 that adjoins the two cheek plates, drive-side cheek plate 2 and output-side cheek plate 3, in axial direction, at least indirectly; in other words, contacts the axially aligned front faces 9 and 10 of drive-side cheek plate 2 and output side cheek plate 3, directly or indirectly. In the illustrated example front faces 8 and 9 in the area of the larger diameter 7 of step bolt 6, and front faces 10 and 11 of the drive-side and output-side cheek plates 2 and 3 that are facing each other, act as contact surfaces. The contact surfaces are identified with 12a and 12b on the step bolt, whereby contact surface 12a in a no-load condition is consistent with a section of front face 8, while the possible contact surface 12b is consistent with front face 9. The surfaces acting as contact surfaces on the drive-side and output-side cheek plate elements are formed by front face 10 on first cheek plate 2 in the form of contact surface 13, and front face 11 on second cheek plate 3 in the form of contact surface 14.

In a condition that is free of torque load, in other words in its installed state, the contact surfaces facing each other, in this instance contact surface 12a and 13, as well as contact surfaces 12b and 14, describe contact regions 15 and 16. Contact region 15 can be described by the interacting surface areas on contact surfaces 12a and 13, while contact region 16 can be described by the interacting surface areas on contact surfaces 12b and 14 between step bolt 6 and second cheek plate 3. According to the present invention at least one element is equipped with a profile, for realization of the region 15 or 16. According to the first inventive design, this profile is provided on step bolt 6 in the larger diameter region 7. The profile is designed so that it is connected in a single component with the larger diameter region 7 on step bolt 6. A multitude of possibilities exists with regard to the design of the profile. FIG. 1a illustrates one example of a profile 17 and 18 on the contact surfaces 12a and 12b, in the larger diameter region 7 of step bolt 6. In this example, the profile is designed so that its cross section tapers in radial direction when viewed in axial direction, from the area of the external diameter 19 of the larger diameter region 7 of the step bolt, toward the axis A of step bolt 6, or toward the smaller diameter. It is not necessary for the profile to extend from the area of the outer circumference 19 in the larger diameter region to the outer circumference 22 in the smaller diameter region, or the smaller dimensional area in radial direction of transmission element 5. It is only important that, in its installed position in web 1 and viewed in radial direction, the profile extends over a section of the possible contact surface 13 or 14 respectively on drive-side cheek plate 2 or output-side cheek plate 3, respectively. However, under load conditions contact of front face 8 or 9 respectively in the larger diameter region of the step bolt 6 is avoided with front faces 10 or 11 of first cheek plate 2 and second cheek plate 3 respectively.

Preferably however, the profile would be designed as indicated in FIG. 1a, so that it extends in radial direction in the installation position, viewed cross-sectionally along the radial extension of at least one of the elements that are to be connected, first cheek plate 2 or second cheek plate 3, in contact region 15 and 16 respectively. In the present example this relates to profile 18 that possesses a larger outside diameter 20 in radial direction than outside diameter 21 of second cheek plate 3 in contact region 16.

Figure 1B:
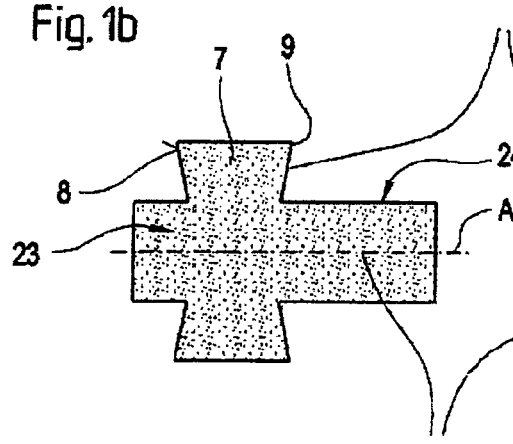
Figure 1C:
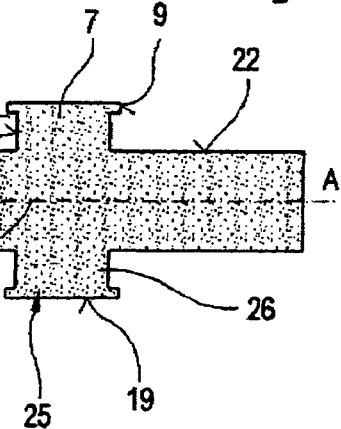

FIGS. 1b and 1c illustrate additional possible designs of contact surface profiling on front faces 8 and 9 respectively, in the region of larger diameter area 7 of the transmission or connecting element 5 that is in the embodiment of step bolt 6. The entire front face 8, 9 can act as a contact surface, as can also only a part of it. According to FIG. 1b the profile is designed so that the transmission or connecting element in the larger diameter region 7 displays an essentially trapezoid cross section for the protruding part, whereby the larger diameter region 7 tapers from the outside circumference 19 toward axis A of the transmission element. The tapering extends to the outside circumference 22 of transmission element 5, especially of step bolt 6 in region 23, 24 which does not incorporate the larger diameter region 7. In other words, the cross section of the protruding part that is formed by the larger diameter region 7 has a larger outside circumference 19 in axial direction than the outside circumference 22 of region 23 that does not incorporate the larger diameter region 7.

FIG. 1c depicts an additional variation of the profile of contact surface 12a, 12b which is formed, for example, by front faces 8 and 9. Viewed cross-sectionally, this profile is formed by an area of a greater axial extension 25 in the radially external region, or in other words in the region of outside circumference 19 of the protruding section on step bolt 6. It additionally possesses an area of lesser axial extension 26 that is located in radial direction between the outside circumference 22 of region 23 and 24 which does not incorporate the larger diameter region 7, and between the area of the greater axial extension 25. The region of the greater axial extension 25 is created by protrusions that are developed along the circumference and run preferably along the entire circumference, viewed cross-sectionally in axial direction and facing toward the cheek plates.

FIGS. 1a through 1c illustrate the fundamental principle of the inventive arrangement of a profile on front faces 8 and 9 of step bolt 6 which act as the contact surfaces when utilized as transmission element 5 in a split web arrangement 1. Other profile arrangements are also feasible. It is essential that the profile possesses a larger axial extension in the radially external region of the transmission element 5 than in the radially internal region. Actual profile arrangements are at the discretion of the responsible resident expert, depending on individual application requirements and feasibility of manufacture.

Figure 3:
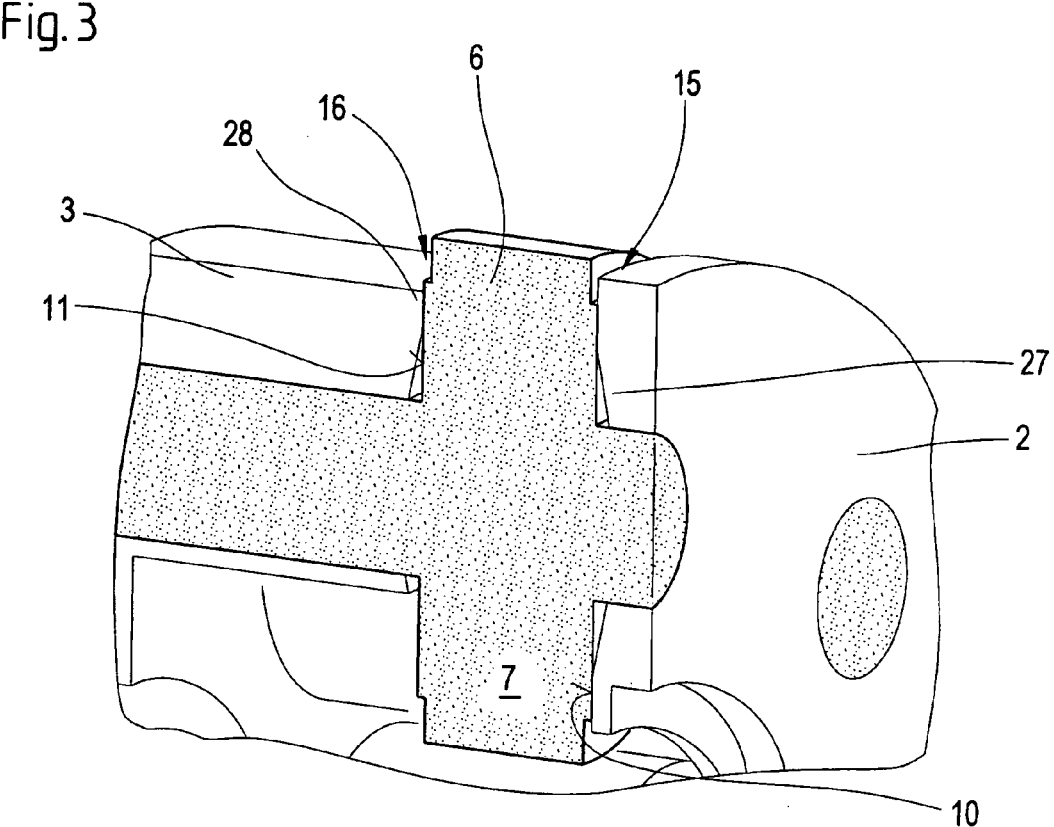
FIG. 3 illustrates an additional inventive embodiment of the profile on the contact surfaces of web elements interacting with each other, in the form of a profile of the web elements.

FIG. 3 depicts an additional second embodiment of contact surface profiling on elements of a split web arrangement 1 that are to be connected. The basic design of the web is essentially consistent with that illustrated in FIGS. 1 and 2.

Therefore, identical elements will be referred to with the identical references. According to the second embodiment a profile is provided in contact region 15 and 16 between the larger diameter region 7 on step bolt 6, and first cheek plate 2 and second cheek plate 3 respectively. The profile, referenced here with 27, 28, is provided on the front face 10 of first cheek plate 2 and front face 11 of second cheek plate 3 respectively. The profile is designed so that cheek plates 2 and 3 possess a greater axial extension in the radially external region than in the radially internal region. When viewing one cross section it can be seen that first cheek plate 2 or second cheek plate 3 respectively taper in radial direction to the axis of the transmission or connecting elements 5.

The profile 27, 28 can be formed in circumferential direction by a protrusion extending in circumferential direction, or alternatively by a multitude of such protrusions. This implies that a multitude of individual contact surfaces are provided in circumferential direction, that would interact with contact surfaces 12a, 12b on transmission element 5, especially on step bolt 6. This interaction is achieved by a multitude of surface contacts. It is preferably however, if a design is selected that, when viewed in circumferential direction, forms an even contact surface on front faces 10, 11 of cheek plates 2, 3.

Figure 4:
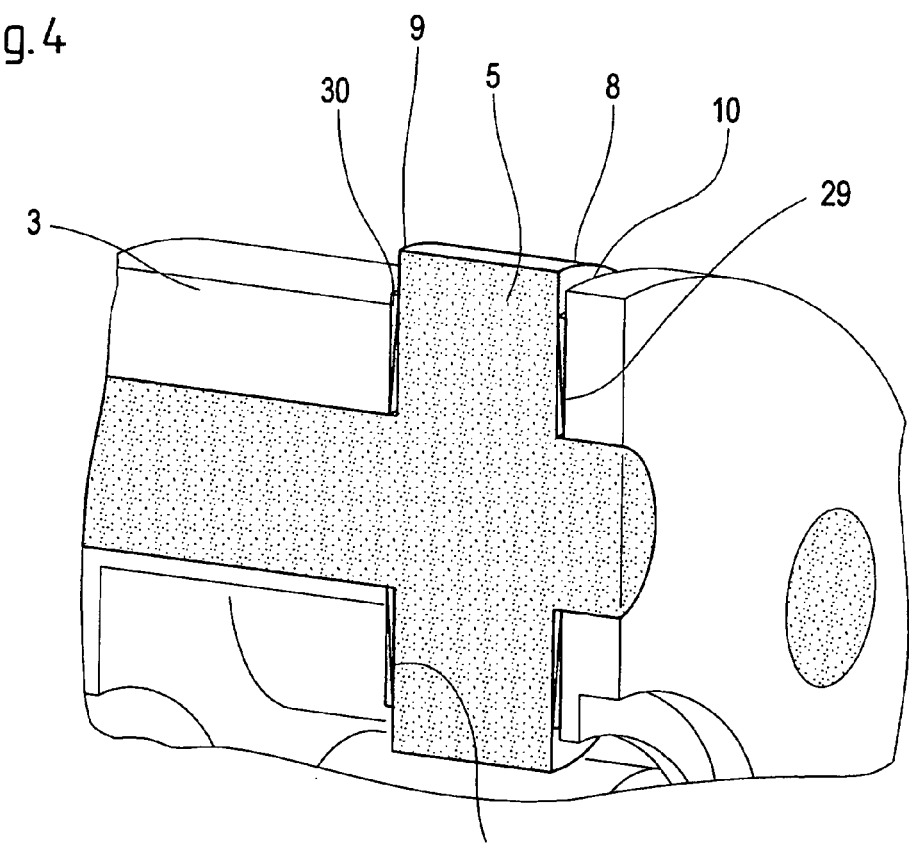
FIG. 4 is a web segment, showing an additional embodiment of the profile of the contact surfaces of the individual interacting web elements, whereby this example illustrates profiling by way of an intermediate component.

FIG. 4 illustrates a third variation of a profile design of the connected elements of a split web arrangement 1, which interact with each other. The basic design also corresponds with that as described in FIGS. 1a–3. Therefore, identical references are used for identical components. In the arrangement illustrated in FIG. 4 contact is achieved through profiled contact surfaces with the assistance of an intermediate element 29 and 30, located between the interacting surface areas on the front faces 8 on transmission element 5 and 10 on first cheek plate 2 or intermediate element 30 on front face 9 on transmission element 5 and 11 on the second cheek plate 3. This design permits utilization of conventional, unmodified step bolts 6, and at the same time allows the desired effect of the presently inventive solution, greater rigidity in the web construction, to be achieved. This solution distinguishes itself through low design and manufacturing costs and may be incorporated into already existing split web configurations without considerable additional costs.

Figure 5A:
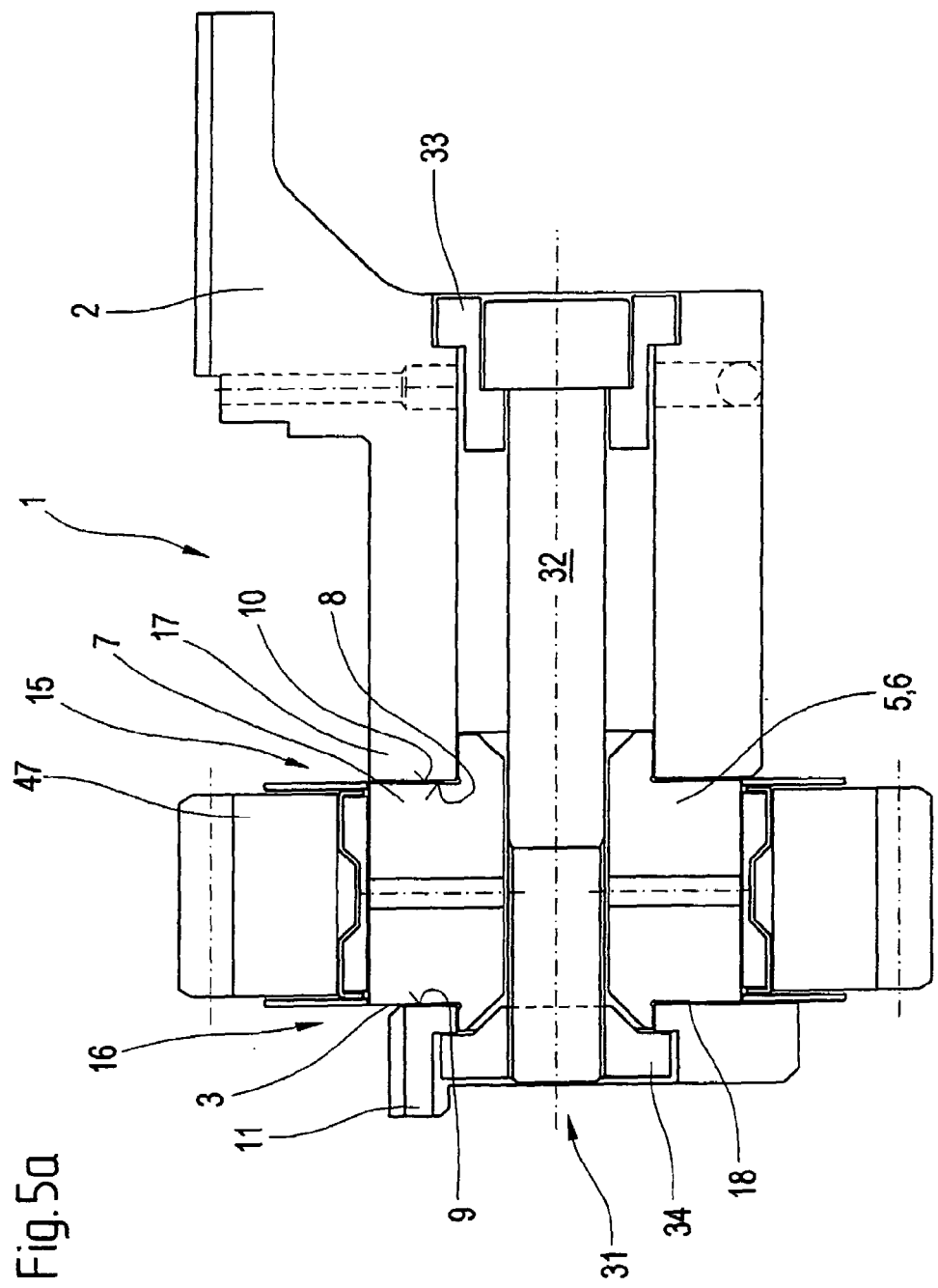
FIGS. 5a and 5b illustrate examples of axial coupling and tensioning with a transmission element in the embodiment of a single-component step bolt.
Figure 5B:
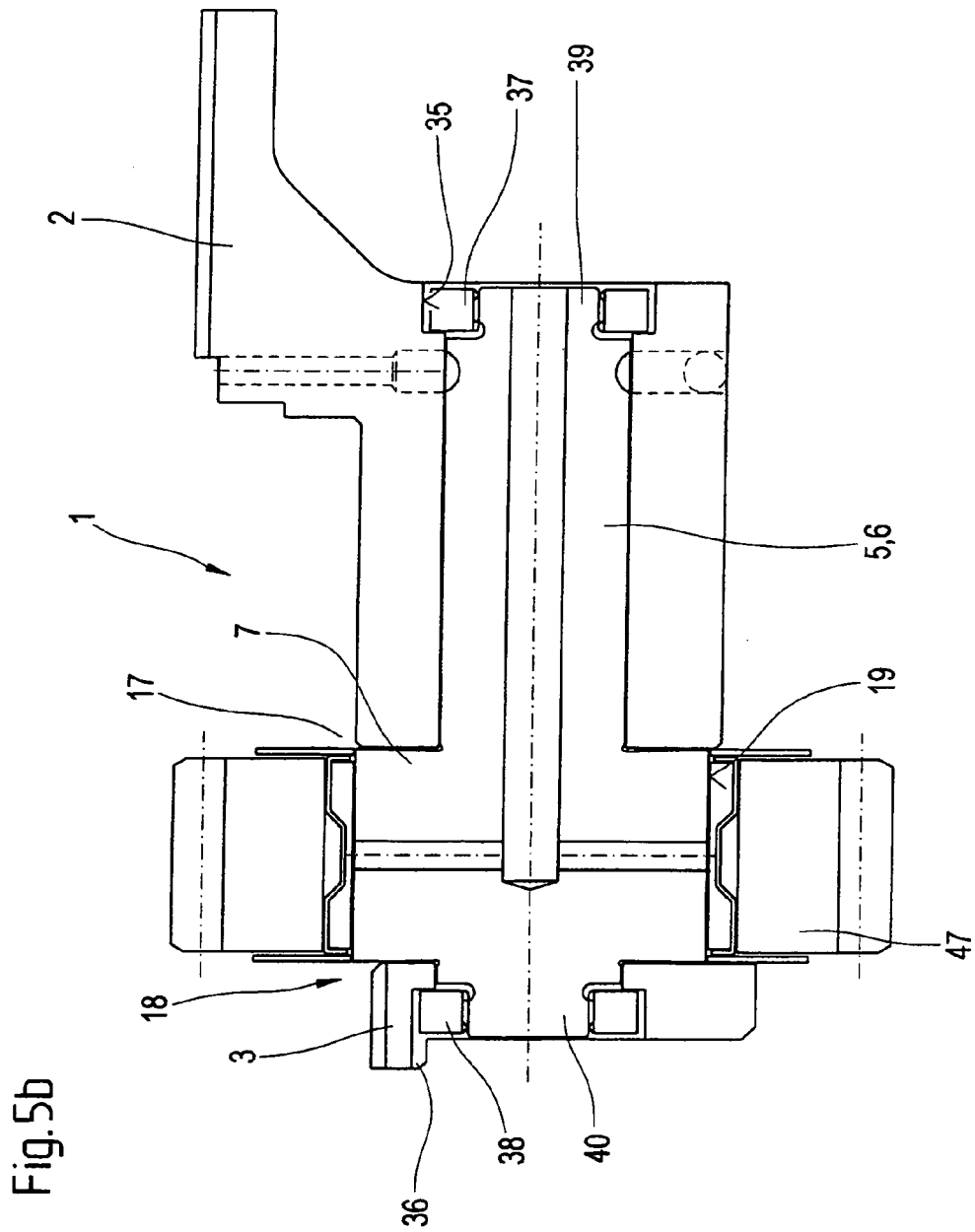

FIGS. 5a and 5b are sectional drawings, depicting solutions for accomplishing the axial connection between two web elements through transmission element 5 in the form of step bolt 6, and accomplishing axial tensioning. In this example transmission element 5 is designed as a single-part step bolt 6. This incorporates a region of a greater radial diameter 7, whereby this region forms two front faces 10 and 11 due to the cross sectional changes. The front faces fit closely against front surfaces 8 and 9 of the two web elements 2 and 3 in contact regions 15 and 16. In the illustrated example step bolt 6 is executed with a profile 17 and 18 on the respective front faces 10 and 11. The step bolt supports a planetary gear 47. The axial tensioning between the transmission or connecting element 5 and web elements 2 and 3 is realized through element 31. Tensioning means 31 in the illustrated example embody screw 32 which is placed through the two web elements 2 and 3 and step bolt 6 and which is supported by a web element, in this example web element 2, directly or as illustrated indirectly by an intermediate element 33 which secures the position of screw 32 in axial direction to web element 3 and which limits the mobility in this direction. Cover disk 34 is also provided for tensioning. This is in close contact with web element 3 and is equipped with an internal thread. The design according to FIG. 5a illustrates an example with a profile on transmission element 5. An alternative profile design on front faces 8 and 9 of web elements 2 and 3 respectively is however, also feasible.

FIG. 5b illustrates another possible variation of web unit 1, including two web elements 2 and 3 with a transmission or connecting element 5 in the embodiment of step bolt 6. In this example step bolt 6 is also a single-component unit and extends in axial direction in its installed position into web elements 2 and 3 respectively which, for this purpose, are equipped with through-openings 35 and 36. Securing and axial tensioning in this example is accomplished through threaded joints and of so-called ring nuts 37 and 38. These are screwed onto end sections 39 and 40 of step bolt 6. For this purpose step bolt 6 is configured in its end sections 39 and 40 as a threaded journal onto which a ring nut 37 or 38 can be screwed that supports itself on web element 2 or 3 respectively. Here too, profile 17 and 18 is shown on the transmission or connecting element 5. In the illustrated example, when viewed in axial direction, said profile tapers continuously from the radial outer circumference 19 in direction of the theoretical connecting axis of the connecting element. Here too, an appropriate profile of web elements 2 and 3 can be provided either alternatively or in addition.

Figure 6A:
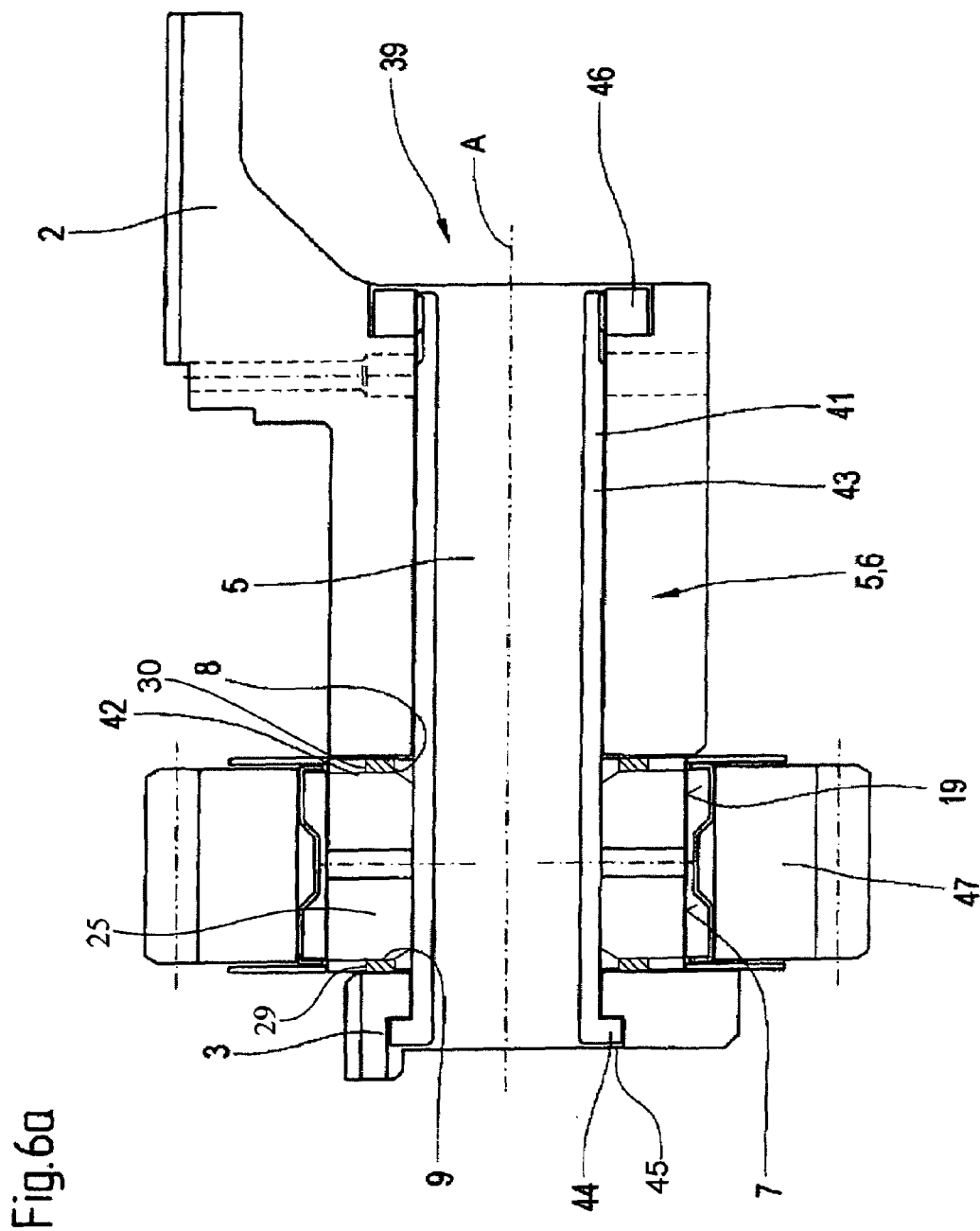
FIGS. 6a–6c illustrate examples of axial coupling and tensioning with a transmission element in the embodiment of a multi-component step bolt.
Figure 6B:
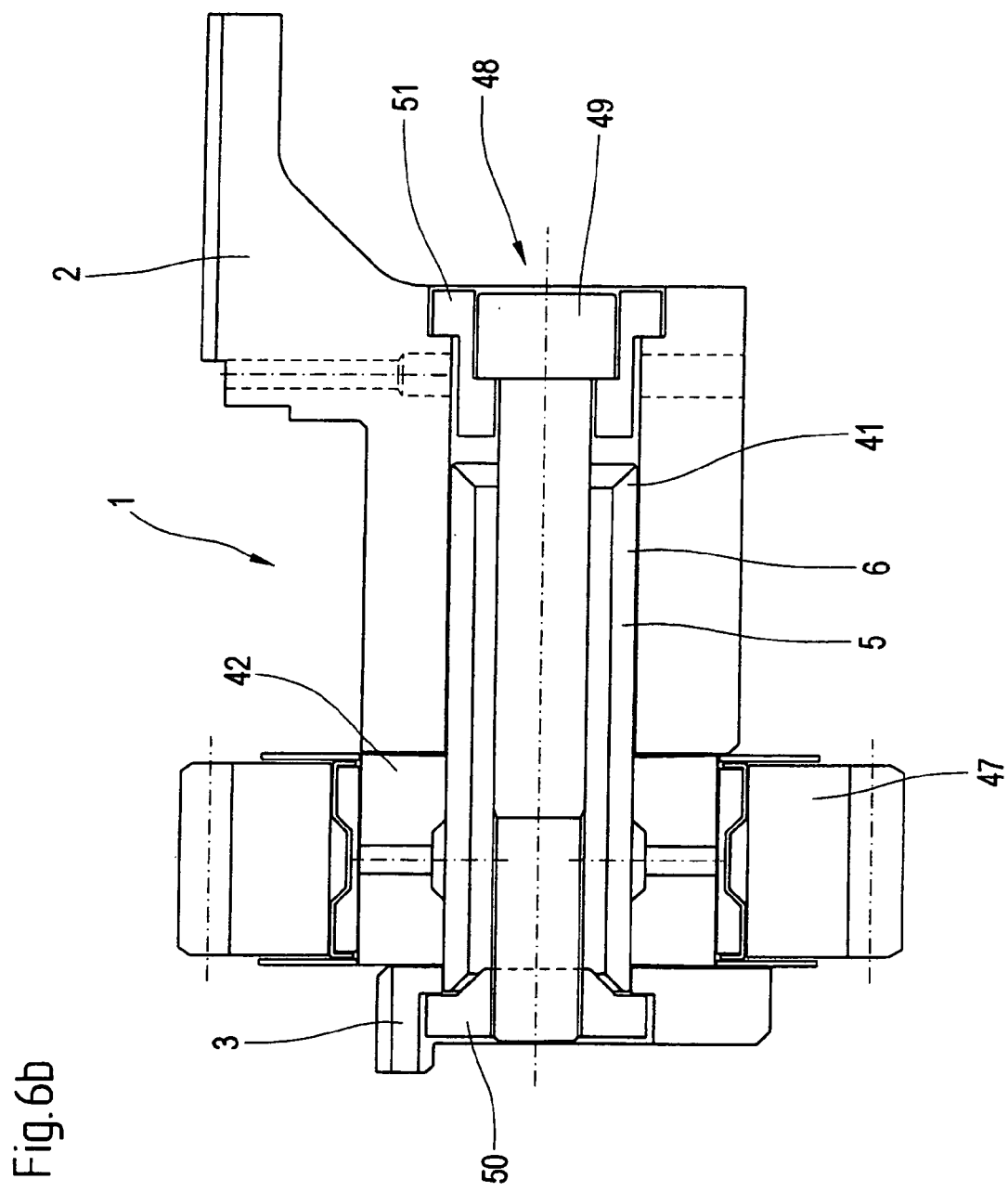
Figure 6C:
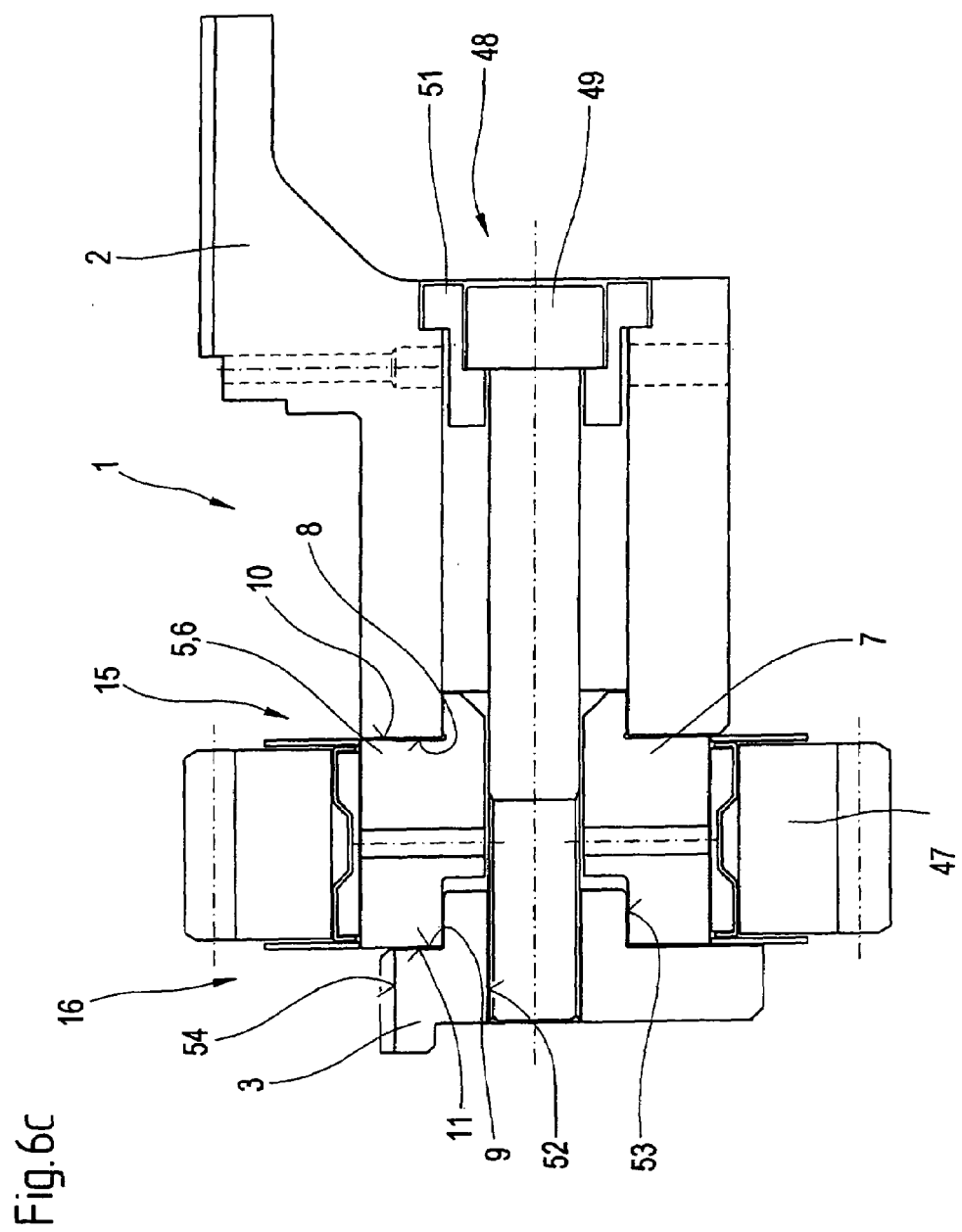

FIGS. 6a–6c on the other hand, illustrate designs whereby the transmission or connecting element 5 is in the form of step bolt 6, however in a multi-component configuration. In the design according to FIG. 6a, step bolt 6 includes first support sleeve 41 and second support sleeve 42. First support sleeve 41 extends in axial direction in each instance into the area of the axial extension of two web elements 2 and 3, or even beyond these. In the illustrated example the first support sleeve embodies the form of cylindrical element 43 which, in the area of one of its two ends has cylindrical shoulder 44 in the form of a flange. The protrusion resulting from cylindrical shoulder 44 facilitates support on one of two web elements 2 or 3, in the present example on web element 3, whereby said protrusion engages in a recess in the form of bore 45. The opposite end section 39 includes a threaded support sleeve 41. In the present example this is an outside thread onto which ring nut 46 may be mounted which, in turn supports itself on web element 2. Second support sleeve 42 forms the larger radial diameter region 7, whereby this also facilitates support of planetary gear 47. In the illustrated example, support sleeve 42 is equipped with a profile that, in its simplest scenario is characterized by a constant tapering of the axial dimensions in radial direction, from outside circumference 19 in direction of the axis A of the transmission or connecting element 5. An arrangement with an appropriate profile of the two facing front faces 8 and 9 of web elements 2 and 3 is also feasible. The profile could be designed as illustrated in FIGS. 1a–1c.

FIG. 6b illustrates an additional example of the transmission or connecting element 5 in the embodiment of a multi-part step bolt 6 between two web elements 2 and 3. The axial coupling and tensioning is accomplished through appropriate fastening devices 48. In the illustrated example these include screw 49 and, for tensioning of the screw or fastening device comprise nut 50. In this example the transmission or connecting element 5 also includes first support sleeve 41 and second support sleeve 42. Both support sleeves are tensioned against each other in radial direction, preferably in the form of a transverse compression joint. In its installed position, support sleeve 41 extends into the area of the axial extension, into an appropriate through-opening of first web element 2 and second web element 3.

The connecting screw supports itself on intermediate element 51 on first web element 2. Tensioning is then realized by way of ring nut 50 which rests against the other web element 3. The profile in this example occurs also on the transmission element 5, specifically on second support sleeve 42 that serves to support planet gear 47.

FIG. 6c illustrates an additional variation for facilitating the axial coupling and tensioning of the elements, web element 2, web element 3 and transmission or connecting element 5 which, in this example embodies step bolt 6 in a single-component configuration. Step bolt 6 supports planetary gear 47 in the region of the greater radial diameter 7 and extends in the area of the lesser radial diameter into one of web elements 2 or 3, in the illustrated example into a through-opening.

Tensioning occurs through fastening devices 48, including bolt 6 that supports itself through intermediate element 51, or directly on web element 2. The function of the ring nut is undertaken by web element 3, whereby the web element is equipped with an appropriate bore, preferably an internally threaded through-opening 52. In the illustrated example web element 3 is designed with at least two areas of different outside diameters 53 and 54, whereby the area of the smaller diameter 53 forms a support surface for step bolt 6 in radial direction. In axial direction step bolt 6 forms contact region 15 and 16 with its front faces 8 and 9, or the partial surfaces that closely adjoin front faces 10 and 11 of the two web elements 2 and 3 in this area. In the illustrated example step bolt 6 again, exhibits the profile on its two front faces 10 and 11. It is also feasible to designate the profile to the web elements 2 and 3.

FIGS. 5–6c illustrate possible examples to realize axial connection and tensioning of the individual elements of web unit 1, including web elements 2 and 3 and the transmission or connecting elements 5, by way of fastening elements. There are no restrictions on the multitude of possible variations. The actual selection and the combination of the individual possibilities depicted in the drawings remains the responsibility of the responsible resident expert.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

| | Component Identification |
|---|---|
| 1 | Web unit |
| 2 | First web element; first cheek plate |
| 3 | second web element; second cheek plate |
| 4 | Means for axial connection between first cheek plate and second cheek plate |
| 5 | Transmission elements |
| 6 | Step bolt |
| 7 | Area of larger diameter on step bolt |
| 8 | Front face |
| 9 | Front face |
| 10 | Front face |
| 11 | Front face |
| 12a, 12b | Contact surface on step bolt |
| 13 | Contact surface on the first cheek plate 2 |
| 14 | Contact surface on the second cheek plate 3 |
| 15 | Contact area |
| 16 | Contact area |
| 17 | Profile |
| 18 | Profile |
| 19 | Area of the outside circumference in the area of the larger diameter 7 on step bolt 6 |
| 29 | Outside circumference on profile 17 |
| 21 | Outside circumference on profile 18 |
| 22 | Outside circumference |
| 23 | Region not including region 7 |
| 24 | Region not including region of larger diameter 7 |
| 25 | Area of greater axial extension |
| 26 | Intermediate area |
| 27 | Profile |
| 28 | Profile |
| 29 | Intermediate element |
| 30 | Intermediate element |
| 31 | Means for axial tensioning |
| 32 | Screw |
| 33 | Intermediate element |
| 34 | Cover disk |
| 35 | Through-opening |
| 36 | Through-opening |
| 38 | Ring nut |
| 39 | End section |
| 40 | End section |
| 41 | Support sleeve |
| 42 | Support sleeve |
| 43 | Cylindrical element |
| 44 | Cylindrical shoulder |
| 45 | Recess |
| 46 | Ring nut |
| 47 | Planet gear |
| 48 | Fastening device |
| 49 | Screw |
| 50 | Nut |
| 51 | Intermediate element |
| 52 | Through-opening |
| 53 | Area |
| 54 | Area |

The invention claim is:

1. A web unit for planetary gear sets for a mounting of a planetary gears, comprising:
    a first web element having a first web contact region including a first web front face having a first web contact surface;
    a second web element being tightly connected to said first web element, said second web element having a second web contact region including a second web front face having a second web contact surface;
    at least one of a transmission element and a connecting element tensioning said first web element and said second web element progressing in an axial direction describing a theoretical connecting axis, each of said at least one of a transmission element and a connecting element having a plurality of regions of differing radial dimensions, said regions of differing radial dimensions including a first front face having a first contact surface and a second front face having second contact surface, said first contact surface resting in part one of directly against said first web contact surface and indirectly against said first web contact surface through a first intermediate element, said second contact surface resting in part one of directly against said second web contact surface and indirectly against said second web contact surface through a second intermediate element;
    at least one segment of at least one of said first web contact surface, said second web contact surface, said first contact surface, and said second contact surface being formed by at least one profile, at least one said profile being characterized in a radially external region by at least one region of greater axial extension in said axial direction, said region of greater axial extension defines a dimension of said contact surface in an unloaded state of web unit.

2. The web unit of claim 1, wherein at least one said profile is located on at least one of said first web element and said second web element.

3. The web unit of claim 1, wherein at least one said profile is located on said at least one of a transmission element and a connecting element.

4. The web unit of claim 1, wherein said at least one of a transmission element and a connecting element is embodied by a step bolt with a first step bolt front face and a second step bolt front face, said first step bolt front face includes a first step bolt contact surface, said second step bolt front face includes a second step bolt contact surface, both said first step bolt contact surface and said second step bolt contact surface due to a cross sectional change.

5. The web unit of claim 4, wherein said at least one of a transmission element and a connecting element is a single-component construction, both said second web element being tightly connected to said first web element and said tensioning in said axial direction are accomplished through at least one element facilitating a tight coupling and said axial tensioning.

6. The web unit of claim 5, wherein said at least one of a transmission element and a connecting element extends from a region that does not include said plurality of regions of differing radial dimensions into a plurality of through-openings in said first web element and said second web element one of at least partially into said plurality of through-openings in said axial direction and beyond said plurality of through-openings in said axial direction, said at least one element facilitating a tight coupling and said axial tensioning include at least one screw element and at least one ring nut, said at least one screw element is supported in a head region of said at least one screw element on one of said first web element and said second web element, said at least one screw element is directed through said first web element, said at least one of a transmission element and a connecting element and said second web element, said at least one ring nut supports itself on an other of said first web element and said second web element.

7. The web unit of claim 5, wherein said at least one element facilitating a tight coupling and said axial tensioning includes at least one threaded end section on said at least one of a transmission element and a connecting element that interacts with a ring nut, said at least one threaded end section is supported on at least one of said first web element and said second web element.

8. The web unit of claim 4, wherein said at least one of a transmission element and a connecting element is a multi-component construction, both said second web element being tightly connected to said first web element and said tensioning in said axial direction are accomplished through at least one element facilitating a tight coupling and said axial tensioning.

9. The web unit of claim 8, wherein said at least one of a transmission element and a connecting element includes a first support sleeve and a second support sleeve, one of said first support sleeve and said second support sleeve surrounds an other of said first support sleeve and said second support sleeve in a circumferential direction and forms said plurality of regions of differing radial dimensions.

10. The web unit of claim 9, wherein said at least one element facilitating a tight coupling and said axial tensioning includes at least one threaded end section on said first support sleeve and a ring nut interacting with said at least one threaded section, said ring nut is supported in said axial direction on one of said first web element and said second web element.

11. The web unit of claim 10, wherein said first support sleeve includes an end section with a cylindrical shoulder that supports said first support sleeve in said axial direction on one of said first web front face and said second web front face that faces away from said at least one of a transmission element and a connecting element.

12. The web unit of claim 9, wherein said at least one element facilitating a tight coupling and said axial tensioning include a screw element that extends through said first support sleeve and said second support sleeve in said axial direction, said screw element includes a head element supported on one of said first web element and said second web element, a ring nut fastens said element on an other of said first web element and said second web element.

13. The web unit of claim 4, further including at least one intermediate element forming at least one said profile, said at least one intermediate element being located between said first step bolt front face and said second step bolt front face that are created by said cross sectional change, said at least one intermediate element being located between said first web element and said second web element.

14. The web unit of claim 13, wherein said at least one profile is produced by a plurality of discontinuous cross sectional changes of at least one of said first web element, said second web element, said at least one of a transmission element and a connecting element and said at least one intermediate element.

15. The web unit of claim 13, wherein said at least one profile is produced by a plurality of continuous cross sectional changes of at least one of said first web element, said second web element, said at least one of a transmission element and a connecting element and said at least one intermediate element.

* * * * *